(12) United States Patent
Sudo et al.

(10) Patent No.: US 8,630,061 B2
(45) Date of Patent: Jan. 14, 2014

(54) RETAINING A SPOILER IN A HARD DISK DRIVE

(75) Inventors: Kimihiko Sudo, Kanagawa (JP);
Hiromitsu Masuda, Kanagawa (JP);
Kouki Uefune, Kanagawa (JP);
Yoshiyuki Hirono, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 213 days.

(21) Appl. No.: 12/979,288

(22) Filed: Dec. 27, 2010

(65) Prior Publication Data
US 2012/0162824 A1 Jun. 28, 2012

(51) Int. Cl.
*G11B 33/14* (2006.01)

(52) U.S. Cl.
USPC ..................... 360/97.15; 360/97.19

(58) Field of Classification Search
USPC ............ 360/97.13, 97.15, 97.19, 97.12, 97.2, 360/265.6
See application file for complete search history.

(56) References Cited

U.S. PATENT DOCUMENTS

| | | | |
|---|---|---|---|
| 5,140,578 A | 8/1992 | Tahkairin | |
| 5,630,330 A * | 5/1997 | Kung | 70/58 |
| 5,946,164 A * | 8/1999 | Tracy | 360/244.5 |
| 5,982,586 A * | 11/1999 | Scura | 360/256.3 |
| 6,031,690 A * | 2/2000 | Kelemen et al. | 360/256.1 |
| 6,449,119 B1 | 9/2002 | Hashizume et al. | |
| 6,603,633 B2 * | 8/2003 | Heaton et al. | 360/97.19 |
| 6,700,736 B1 | 3/2004 | Wu et al. | |
| 6,876,514 B1 | 4/2005 | Little | |
| 7,054,103 B2 * | 5/2006 | Tadepalli et al. | 360/97.14 |
| 7,545,600 B2 | 6/2009 | Sorrell et al. | |
| 8,050,052 B2 * | 11/2011 | Zheng et al. | 361/802 |
| 2008/0112074 A1 | 5/2008 | Yao et al. | |
| 2009/0002890 A1 | 1/2009 | Chan et al. | |
| 2009/0034125 A1 | 2/2009 | Chan et al. | |
| 2010/0134920 A1 | 6/2010 | Mizumoto et al. | |

OTHER PUBLICATIONS

Zhang, Qi De et al., "Mitigation of flow induced vibration of head gimbal assembly", http://www.springerlink.com/content/utg0642514465x45/, (Mar. 31, 2009),1-7 pages.

* cited by examiner

*Primary Examiner* — Brian Miller (57) ABSTRACT

A hard disk drive comprising, a base plate comprising a pin, a top cover, a plurality of magnetic disks, and a spoiler. The spoiler includes a first spring fastener for temporary spring fastening the spoiler on the base plate, and a second spring fastener for resiliently fastening the spoiler when the top cover is attached to the base plate.

8 Claims, 7 Drawing Sheets

RETAINING A SPOILER IN A HARD DISK DRIVE

BACKGROUND

Typically, it is difficult to accurately position a magnetic head in a hard disk drive (HDD). For example, airflow generated by a spinning disk causes the actuator suspension to vibrate, which prevents correct positioning of the head slider. In particular, disk flutter, caused by turbulence in the airflow generated by the rotation of the magnetic disk, prevents correct positioning of the head with respect to the tracks.

BRIEF DESCRIPTION OF THE DRAWINGS

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Figure 1:
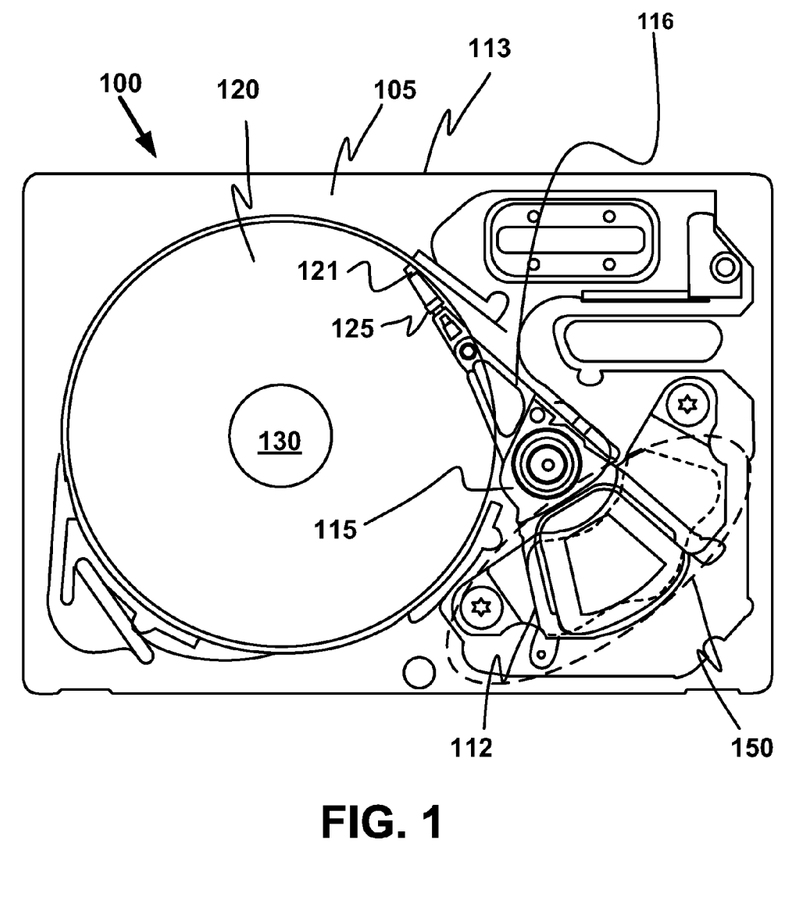
FIG. 1 illustrates an embodiment of an HDD.

With reference now to FIG. 1, a schematic drawing of one embodiment of an information storage system including a magnetic hard disk file or HDD 100 for a computer system is shown, although only one head and one disk surface combination are shown. What is described herein for one head-disk combination is also applicable to multiple head-disk combinations. In other words, the present technology is independent of the number of head-disk combinations.

In general, HDD 100 has an outer sealed housing including a base portion 105 and a top or cover (not shown). In one embodiment, housing contains a disk pack having at least one media or magnetic disk 120. The disk pack (as represented by disk 120) defines an axis of rotation and a radial direction relative to the axis in which the disk pack is rotatable.

A spindle motor assembly having a central drive hub 130 operates as the axis and rotates the disk 120 or disks of the disk pack in the radial direction relative to housing 113. An actuator assembly 115 includes one or more actuator arms 116. When a number of actuator arms 116 are present, they are usually represented in the form of a comb that is movably or pivotally mounted to base 105. A controller 150 or controller is also mounted to base 105 for selectively moving the actuator arms 116 relative to the disk 120.

In one embodiment, each actuator arm 116 has extending from it at least one cantilevered integrated lead suspension (ILS) 125. The ILS 125 may be any form of lead suspension that can be used in a data access storage device. The level of integration containing the slider 121, ILS 125, and read/write head is called the Head Gimbal Assembly (HGA).

The ILS 120 has a spring-like quality, which biases or presses the air-bearing surface of slider 121 against disk 138 to cause slider 121 to fly at a precise distance from disk 138. ILS 120 has a hinge area that provides for the spring-like quality, and a flexing cable-type interconnect that supports read and write traces and electrical connections through the hinge area. A voice coil (not shown), free to move within a conventional voice coil motor (VCM) 112 is also mounted to actuator arms 116 opposite the head gimbal assemblies. Movement of the actuator assembly 115 by controller 150 causes the head gimbal assembly to move along radial arcs across tracks on the surface of disk 138.

In one embodiment, the airflow vibration produced by rotation of the magnetic disk is controlled by an air spoiler. As a result, very accurate positioning of slider 121 is achieved. In other words, an anti-vibration component (an air spoiler or a plate which covers a large part of the disk surface) is provided to suppress vibration of the actuator caused by airflow.

Below are descriptions of various features with respect to HDD 100.

In one embodiment, an air spoiler with a leaf spring is mounted at a prescribed position on a base plate, after which the leaf spring is pressed by the cover and the air spoiler is fixed without the use of screws.

In another embodiment, the air spoiler is provided with a spring for temporary retaining the spoiler during the assembly process. In particular, the air spoiler does not move during the assembly process until it is fixed by the cover.

In a further embodiment, the spoiler ensures that strong airflow does not strike the magnetic head. Moreover, the spoiler allows the reduction of airflow.

Figure 2:
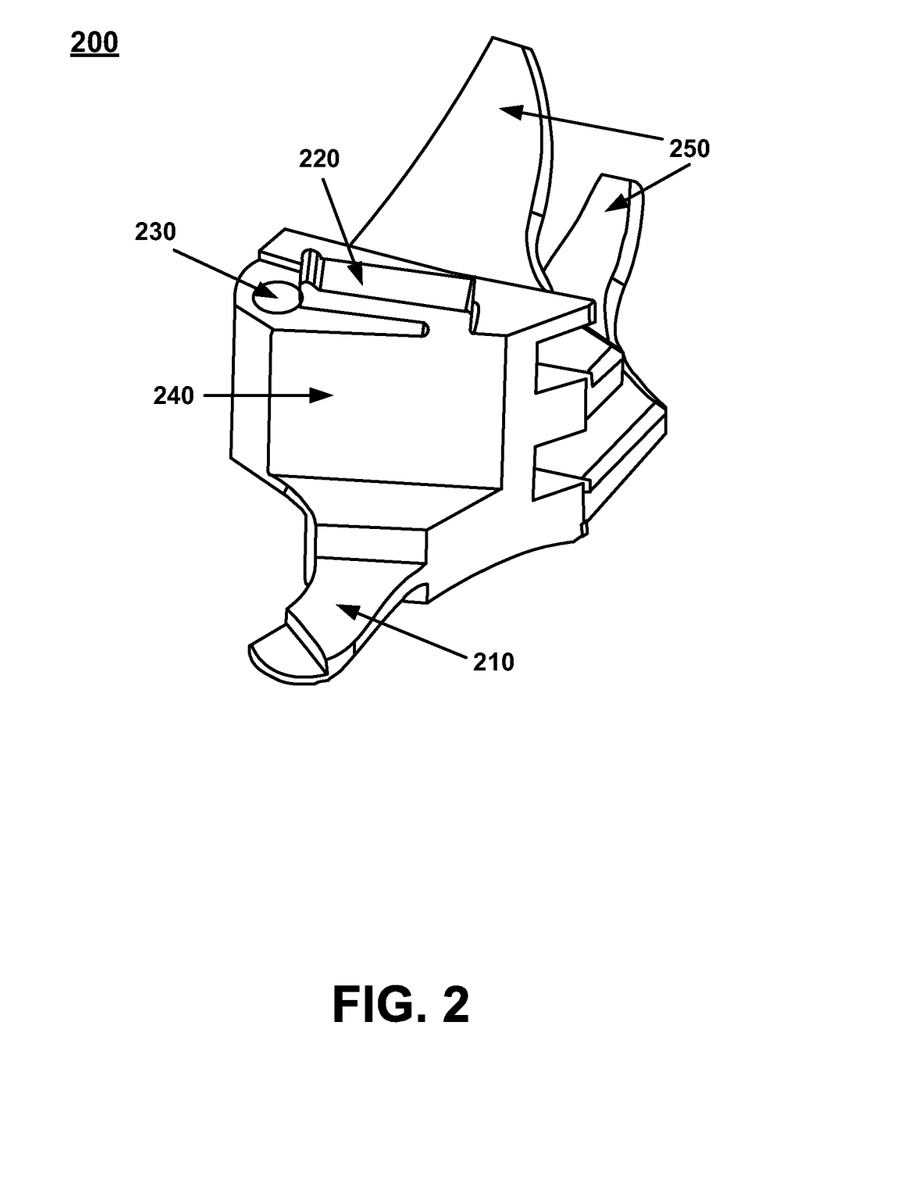
FIGS. 2-6 illustrate embodiments of a spoiler.

FIG. 2 depicts an embodiment of spoiler 200. Spoiler 200 includes first spring fastener 210, second spring fastener 220, through-hole 230, support part 240, and blades 250. In one embodiment, spoiler 200 is disposed upstream (in the direction opposite the direction of the rotation of disk 120) than actuator assembly 115.

Spoiler 200 does not require a screw for fastening within HDD 100. Rather, spoiler is resiliently retained within HDD 100 via second spring fastener 220 (and temporarily via first spring fastener 210), which will be described in detail below. In contrast, in conventional systems, a spoiler is fastened via a screw or similar means.

First spring fastener 210 is for temporarily retaining spoiler 200 onto base 105, which is described in detail below. In one embodiment, first spring fastener is a first leaf spring.

Second spring fastener 220 is for retaining spoiler 200 within HDD 100 when a top cover is affixed to base 105. In one embodiment, second spring fastener 220 is a second leaf spring.

Through-hole 230 is for positioning spoiler 200 with respect to base 113.

Blades 250 are for reducing vibrations (e.g., disk flutter). It should be appreciated that spoiler 200 can include any number of blades that are disposed between any number of magnetic disks.

Figure 3:
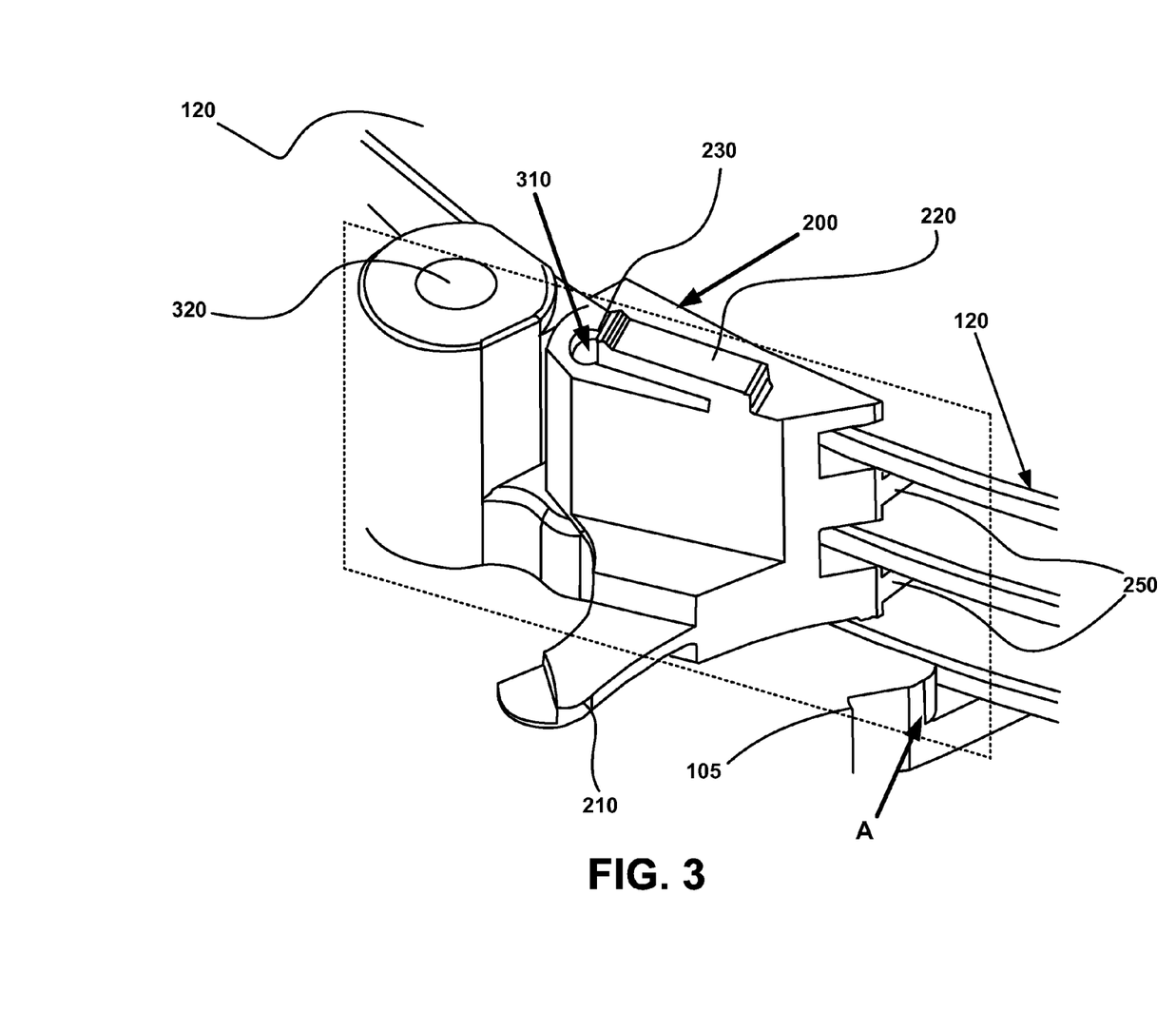
Figure 4:
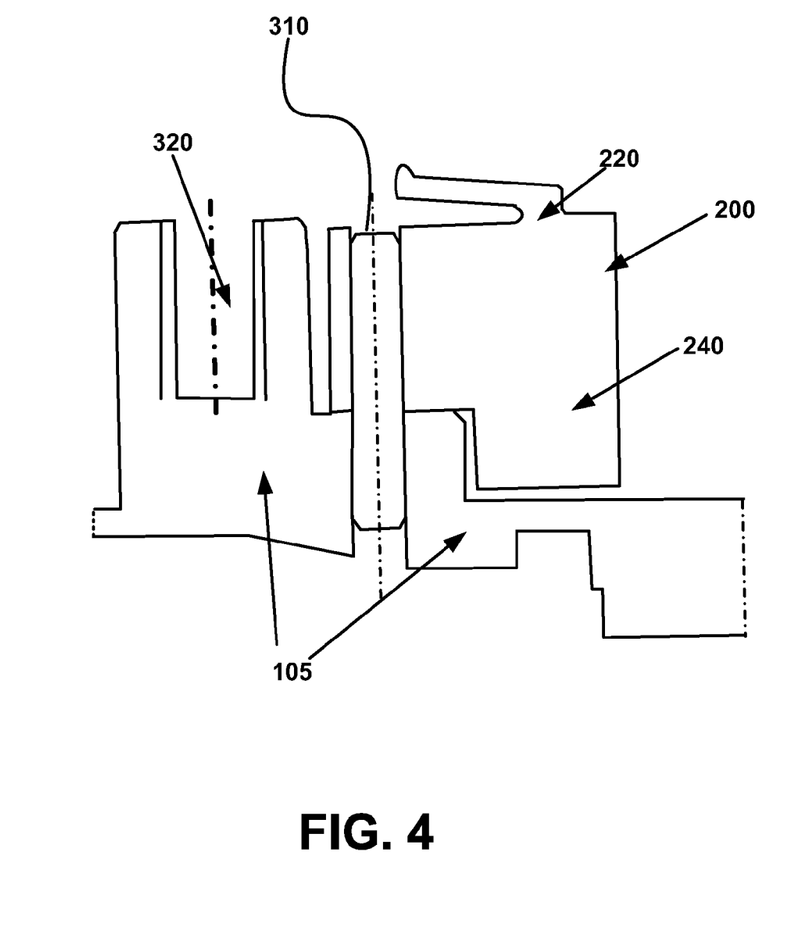

FIG. 3 depicts an embodiment of spoiler 200 with respect to base 105. FIG. 4 is a cross-sectional view along plane A of FIG. 3.

Referring to FIGS. 3 and 4, pin 310 of base 105 is positioned within through-hole 230 for aligning spoiler 200 with respect to base 105. Also, spoiler 200 is positioned such that blades 250 are disposed between disk stack 120. Base 105 also includes threaded-hole 320 for securing top cover to base 105, which is described in detail below.

Figure 5:
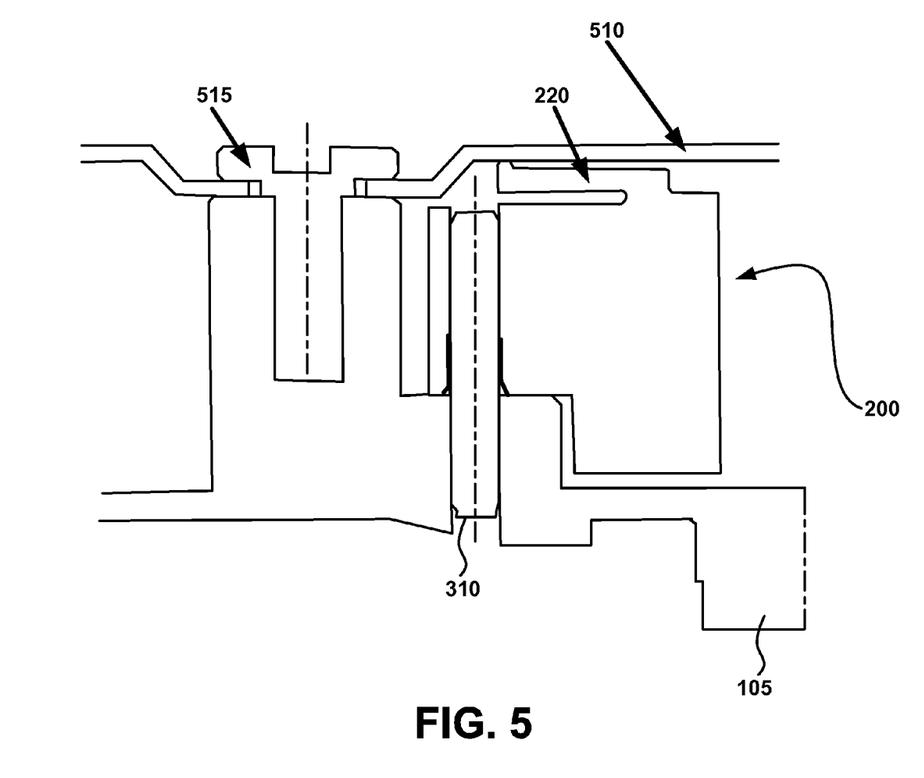

FIG. 5 depicts a cross-section of spoiler 200 with respect to base 105 and top cover 510. As cover 510 is attached to base 105 (e.g., via screw 515), second spring fastener 220 is pressed by cover 510. As a result, the force applied by second spring fastener 220 against cover 510 is sufficient to retain spoiler 200 within HDD 100.

Figure 6:
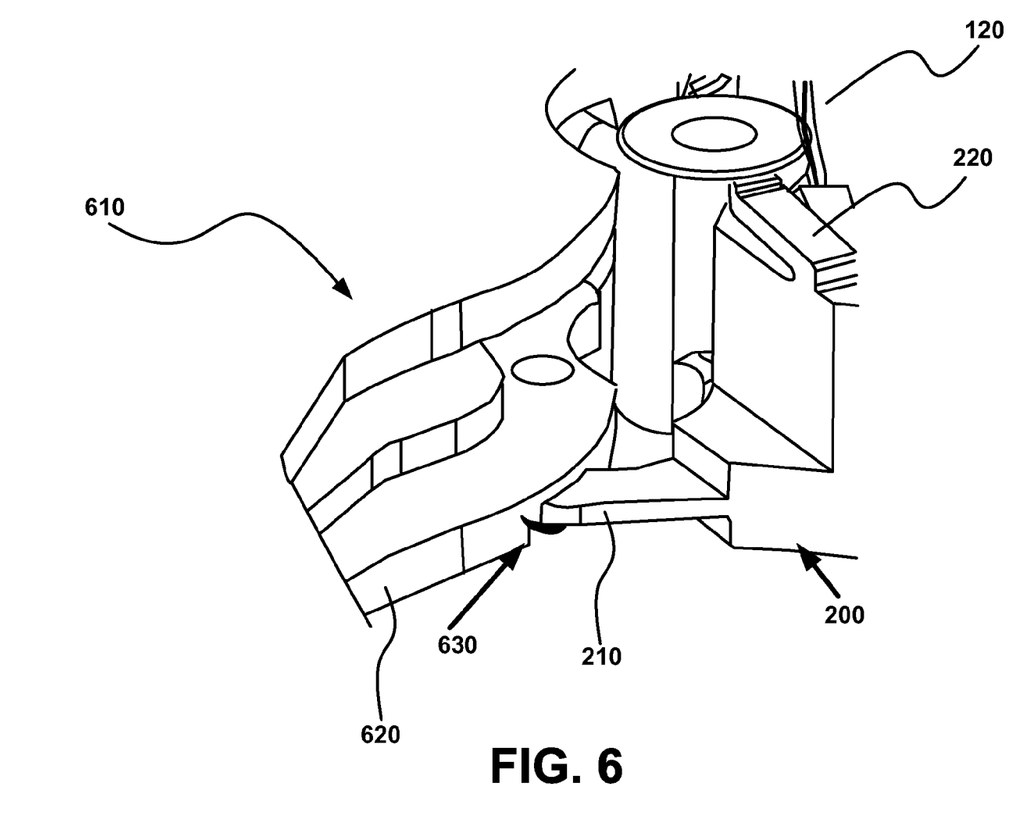

FIG. 6 depicts an isometric view of spoiler 200. As described above, spoiler 200 includes first spring fastener 210 for temporarily retaining spoiler 200 to base 105. For example, during the process of assembling HDD 100, first spring fastener 210 is pressed by voice coil motor (VCM) 610, so as to temporarily retain or affix spoiler 200 in order to ensure that spoiler 200 does not rotate or become separated from pin 310 of base 105, until spoiler 200 is affixed by cover 510.

In particular, VCM 610 includes bottom yoke 620 which includes bottom yoke cavity 630. An end portion of first spring fastener 210 seats within yoke cavity 630 to ensure that spoiler 200 does not rotate or become separated from pin 310 of base 105.

Below is a description of an embodiment for retaining a spoiler in a HDD. First, disk 120 and a ramp (not shown) are attached to base 105. Second, pin 310 of base 105 is inserted into support part 240 through hole 230 of air spoiler 200. Third, air spoiler 200 is rotated about pin 310 and is inserted between disks 120. Fourth, VCM 610 and the head stack assembly are attached to base plate 105.

Fifth, first spring fastener 210 is pressed by the VCM 610, whereby air spoiler 200 is temporarily fixed. The gap between VCM 610 and base plate 105 is very small. Therefore, a cavity is formed on the VCM side in the section corresponding first spring fastener 210. Cover 510 is screwed to base plate 105. At this point, second spring fastener 220 is pressed by cover 510, whereby support part 240 is pressed against base plate 105, and air spoiler 200 is fixed within HDD 100. It should be noted that if the position of screw 515 for screwing cover 510 to base plate 105 is in the region of air spoiler 200, the force with which second spring fastener 220 is pressed by cover 510 can be intensified. Therefore, air spoiler 200 can be fixed with a degree of strength that is suitable for practical usage.

Figure 7:
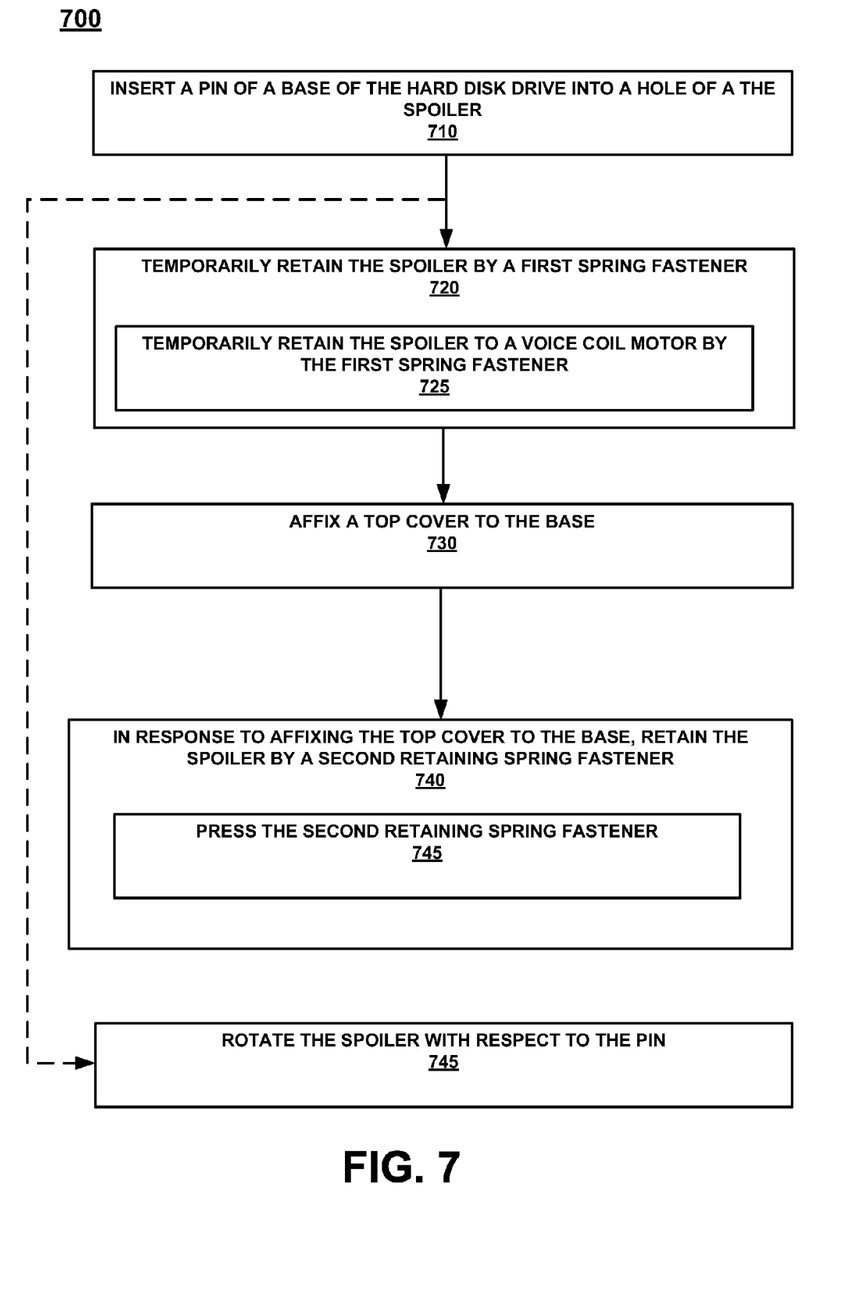
FIG. 7 illustrates an embodiment of a method for retaining a spoiler.

FIG. 7 depicts a method 700 for retaining a spoiler in a hard disk drive. At 710 of method 700, a pin of a base of the hard disk drive is inserted into a hole of a hole of the spoiler.

At 720, the spoiler is temporarily retained by a first spring fastener. In one embodiment, at 725, the spoiler is temporarily retained to a voice coil motor by the first spring fastener.

At 730, a top cover is affixed to the base.

At 740, in response to affixing the top cover to the base, the spoiler is retained by a second retaining spring fastener. In one embodiment, at 745, the second retaining spring fastener is pressed by the top cover.

In one embodiment, at 745, the spoiler is rotated with respect to the pin.

Various embodiments of the present invention are thus described. While the present invention has been described in particular embodiments, it should be appreciated that the present invention should not be construed as limited by such embodiments, but rather construed according to the following claims.

The invention claimed is:

1. A hard disk drive comprising:
    a base plate comprising a pin;
    a top cover;
    a plurality of magnetic disks;
    a spoiler comprising:
        a first spring fastener for temporary spring fastening said spoiler on said base plate; and
        a second spring fastener for resiliently fastening said spoiler when said top cover is attached to said base plate; and
    a voice coil motor, wherein said fist spring fastener engages with said voice coil motor.

2. The hard disk drive of claim 1, wherein said spoiler further comprises:
    a hole, wherein said pin is positioned within said hole.

3. The hard disk drive of claim 1, wherein said spoiler does not require a fastening screw.

4. The hard disk drive of claim 1, wherein said voice coil motor comprises:
    a bottom yoke cavity, wherein an end portion said first spring fastener is seated within said bottom yoke cavity.

5. The hard disk drive of claim 1, wherein said second spring fastener resiliently engages with said top cover.

6. The hard disk drive of claim 1, wherein said first spring fastener comprises:
    a first leaf spring.

7. The hard disk drive of claim 6, wherein said second spring fastener comprises:
    a second leaf spring.

8. The hard disk drive of claim 1, wherein said hard disk drive is a 2.5 inch hard disk drive.

* * * * *

UNITED STATES PATENT AND TRADEMARK OFFICE
CERTIFICATE OF CORRECTION

| | | |
|---|---|---|
| PATENT NO. | : 8,630,061 B2 | Page 1 of 1 |
| APPLICATION NO. | : 12/979288 | |
| DATED | : January 14, 2014 | |
| INVENTOR(S) | : Kimihiko Sudo et al. | |

It is certified that error appears in the above-identified patent and that said Letters Patent is hereby corrected as shown below:

Claims

Column 4, Claim 1, Line 27, Delete: "fist"

Insert --first--

Column 4, Claim 4, Line 36, Delete: "a bottom yoke cavity, wherein an end portion said first"

Insert --a bottom yoke cavity, wherein an end portion of said first--

Signed and Sealed this
Sixteenth Day of February, 2016

Michelle K. Lee
*Director of the United States Patent and Trademark Office*